US012736464B2

(12) United States Patent
Jung et al.

(10) Patent No.: US 12,736,464 B2
(45) Date of Patent: Sep. 15, 2026

(54) SUBSTRATE MEASUREMENT METHOD AND SUBSTRATE MEASUREMENT CONTROL APPARATUS

(71) Applicant: SEMES CO., LTD., Cheonan-si (KR)

(72) Inventors: Dong Seop Jung, Cheonan-si (KR); Hark Ryong Kim, Cheonan-si (KR)

(73) Assignee: Semes Co., Ltd., Chungcheongnam-do (KR)

( * ) Notice: Subject to any disclaimer, the term of this patent is extended or adjusted under 35 U.S.C. 154(b) by 213 days.

(21) Appl. No.: 18/526,423

(22) Filed: Dec. 1, 2023

(65) Prior Publication Data

US 2024/0219297 A1 Jul. 4, 2024

(30) Foreign Application Priority Data

Dec. 28, 2022 (KR) ........................ 10-2022-0187729

(51) Int. Cl.
*G01N 21/31* (2006.01)
*G01N 21/95* (2006.01)
*G06T 7/73* (2017.01)

(52) U.S. Cl.
CPC ......... *G01N 21/31* (2013.01); *G01N 21/9501* (2013.01); *G06T 7/73* (2017.01);
(Continued)

(58) Field of Classification Search
CPC ................ G01N 21/31; G01N 21/9501; G06T 2207/20224; G06T 2207/30148;
(Continued)

(56) References Cited

U.S. PATENT DOCUMENTS 5,682,243 A 10/1997 Nishi
9,030,661 B1 * 5/2015 Mieher ................. G03F 9/7088 356/400

(Continued)

FOREIGN PATENT DOCUMENTS

CN 101561640 A * 10/2009 ............. G03B 27/68
JP H10-173029 A 6/1998

(Continued)

OTHER PUBLICATIONS

Korean Office Action dated Feb. 28, 2025 issued in corresponding Korean Patent Application No. 10-2022-0187729.

*Primary Examiner* — Tri T Ton
(74) *Attorney, Agent, or Firm* — Harness, Dickey & Pierce, P.L.C.

(57) ABSTRACT

Provided is a substrate measurement method and substrate measurement control apparatus capable of greatly reducing measurement time by skipping a general identification mark recognition process, the substrate measurement method including (a) obtaining entire coordinates for an entire area of wafer by using a standard wafer, (b) aligning a measurement target wafer on a substrate stage by using at least shape features of the measurement target wafer, (c) moving a camera or the substrate stage having the measurement target wafer thereon by using the entire coordinates to position a target area of the measurement target wafer within a measurement area of the camera, and (d) measuring the target area of the measurement target wafer by using the camera.

18 Claims, 13 Drawing Sheets

(52) U.S. Cl.
CPC ............... *G06T 2207/20224* (2013.01); *G06T 2207/30148* (2013.01); *G06T 2207/30204* (2013.01)

(58) Field of Classification Search
CPC . G06T 2207/30204; G06T 7/73; H01L 22/12; H01L 22/20
USPC .......................................................... 356/300
See application file for complete search history.

(56) References Cited

U.S. PATENT DOCUMENTS

| | | | | |
|---|---|---|---|---|
| 9,036,895 | B2 | 5/2015 | Sohn et al. | |
| 11,442,372 | B2 | 9/2022 | Bijnen et al. | |
| 2006/0050267 | A1* | 3/2006 | Murakami | G06T 7/74 356/237.2 |

FOREIGN PATENT DOCUMENTS

| | | | |
|---|---|---|---|
| KR | 2000-0073542 | A | 12/2000 |
| KR | 100413400 | B1 | 3/2004 |
| KR | 10-2008-0068981 | A | 7/2008 |
| KR | 10-2013-0126037 | A | 11/2013 |
| KR | 10-2016-0061747 | A | 6/2016 |
| KR | 2021-0129699 | A | 10/2021 |

* cited by examiner

SUBSTRATE MEASUREMENT METHOD AND SUBSTRATE MEASUREMENT CONTROL APPARATUS

CROSS-REFERENCE TO RELATED PATENT APPLICATION

This application claims the benefit of Korean Patent Application No. 10-2022-0187729, filed on Dec. 28, 2022, in the Korean Intellectual Property Office, the disclosure of which is incorporated herein in its entirety by reference.

BACKGROUND OF THE DISCLOSURE

1. Field of the Disclosure

The present disclosure relates to a substrate measurement method and substrate measurement control apparatus and, more particularly, to a substrate measurement method and substrate measurement control apparatus capable of greatly reducing measurement time by skipping a general identification mark recognition process.

2. Description of the Related Art

FIG. 1 is a plan view of a wafer W for describing a general substrate measurement method. FIG. 2 is a flowchart of an example of the general substrate measurement method.

In general, according to the general substrate measurement method for measuring spectral reflected light of irradiated light in order to measure surface quality of a wafer, as shown in FIG. 1, general identification mark 1 on a wafer W is recognized and measurement target 1 is measured based on the recognized identification mark 1, general identification mark 2 is recognized and measurement target 2 is measured, and then general identification mark 3 is recognized and measurement target 3 is measured.

Therefore, as shown in FIG. 2, according to the general substrate measurement method, a camera or a substrate stage moves to a general identification mark, i.e., a shot mark (S1), the camera auto-focuses on the identification mark (S2), a pattern of the identification mark is matched to an alignment position (S3), X-axis and Y-axis offsets of a target to which the camera or the substrate stage is to be moved are obtained (S4), the camera or the substrate stage is moved to the target (S5), and the target may be measured (S6).

However, according to the above-described general substrate measurement method, because identification marks and targets are alternately measured, when the number of measurement points is large, measurement time is significantly increased and thus the loss of tack time of equipment is increased.

SUMMARY OF THE DISCLOSURE

The present disclosure provides a substrate measurement method and substrate measurement control apparatus capable of greatly reducing measurement time of equipment and increasing precision of measurement by mapping an entire area at a time by using a standard wafer and thus directly moving to targets. However, the above description is merely an example, and the scope of the present disclosure is not limited thereto.

According to an aspect of the present disclosure, there is provided a substrate measurement method including (a) obtaining entire coordinates for an entire area of wafer by using a standard wafer, (b) aligning a measurement target wafer on a substrate stage by using at least shape features of the measurement target wafer, (c) moving a camera or the substrate stage having the measurement target wafer thereon by using the entire coordinates to position a target area of the measurement target wafer within a measurement area of the camera, and (d) measuring the target area of the measurement target wafer by using the camera.

According to the embodiment of the present disclosure, step (a) may include (a-1) aligning the standard wafer on the substrate stage by using shape features of the standard wafer, (a-2) measuring an X-axis coordinate and a Y-axis coordinate of each of a plurality of dies partitioned on the standard wafer, by using the camera, and (a-3) storing the X-axis and Y-axis coordinates of all dies partitioned on the standard wafer and mapping the X-axis and Y-axis coordinates to the entire coordinates.

According to the embodiment of the present disclosure, in step (a-1), the shape features of the standard wafer may include at least one of an edge, a notch, a pattern, and an identification mark of the standard wafer, and combinations thereof.

According to the embodiment of the present disclosure, in step (b), the shape features of the measurement target wafer may include at least one of an edge, a notch, a pattern, and an identification mark of the measurement target wafer, and combinations thereof.

According to the embodiment of the present disclosure, step (c) may include (c-1) calculating a first offset by subtracting a coordinate of a first target area of the measurement target wafer from a coordinate of the measurement area of the camera by using the entire coordinates to position the first target area within the measurement area of the camera in order to move the measurement area of the camera to the first target area by skipping an identification mark, and (c-2) positioning the first target area of the measurement target wafer within the measurement area of the camera by moving the camera or the substrate stage having the measurement target wafer thereon by using the first offset.

According to the embodiment of the present disclosure, in step (c-2), the first offset may include an X-axis offset and a Y-axis offset.

According to the embodiment of the present disclosure, in step (c-2), the first offset may include a shortest moving distance to which the X-axis and Y-axis offsets are reflected.

According to the embodiment of the present disclosure, step (c) may further include (c-3) calculating a second offset by subtracting a coordinate of a second target area of the measurement target wafer from a coordinate of the measurement area of the camera by using the entire coordinates to position the second target area within the measurement area of the camera in order to move the measurement area of the camera to the second target area by skipping an identification mark, and (c-4) positioning the second target area of the measurement target wafer within the measurement area of the camera by moving the camera or the substrate stage having the measurement target wafer thereon by using the second offset.

According to the embodiment of the present disclosure, step (c) may further include (c-5) calculating a third offset by subtracting a coordinate of a third target area of the measurement target wafer from a coordinate of the measurement area of the camera by using the entire coordinates to position the third target area within the measurement area of the camera in order to move the measurement area of the camera to the third target area by skipping an identification mark, and (c-6) positioning the third target area of the measurement target wafer within the measurement area of the camera by moving the camera or the substrate stage having the measurement target wafer thereon by using the third offset.

According to the embodiment of the present disclosure, step (d) may include measuring spectral reflected light of irradiated light in order to measure surface quality of the measurement target wafer.

According to the embodiment of the present disclosure, the standard wafer may be the same as or have the same size as the measurement target wafer.

According to another aspect of the present disclosure, there is provided a substrate measurement control apparatus including an entire coordinate obtainer for obtaining entire coordinates for an entire area of wafer by using a standard wafer, a measurement target wafer alignment controller for aligning a measurement target wafer on a substrate stage by using at least shape features of the measurement target wafer, a movement controller for moving a camera or the substrate stage having the measurement target wafer thereon by using the entire coordinates to position a target area of the measurement target wafer within a measurement area of the camera, and a measurement controller for measuring the target area of the measurement target wafer by using the camera.

According to the embodiment of the present disclosure, the entire coordinate obtainer may include a standard wafer alignment controller for aligning the standard wafer on the substrate stage by using shape features of the standard wafer, an individual die coordinate measurer for measuring an X-axis coordinate and a Y-axis coordinate of each of a plurality of dies partitioned on the standard wafer, by using the camera, and an entire die mapper for storing the X-axis and Y-axis coordinates of all dies partitioned on the standard wafer and mapping the X-axis and Y-axis coordinates to the entire coordinates.

According to the embodiment of the present disclosure, the standard wafer alignment controller may recognize the shape features of the standard wafer including at least one of an edge, a notch, a pattern, and an identification mark of the standard wafer, and combinations thereof.

According to the embodiment of the present disclosure, the measurement target wafer alignment controller may recognize the shape features of the measurement target wafer including at least one of an edge, a notch, a pattern, and an identification mark of the measurement target wafer, and combinations thereof.

According to the embodiment of the present disclosure, the movement controller may include a first offset calculator for calculating a first offset by subtracting a coordinate of a first target area of the measurement target wafer from a coordinate of the measurement area of the camera by using the entire coordinates to position the first target area within the measurement area of the camera in order to move the measurement area of the camera to the first target area by skipping an identification mark, and a first target area movement controller for positioning the first target area of the measurement target wafer within the measurement area of the camera by moving the camera or the substrate stage having the measurement target wafer thereon by using the first offset.

According to the embodiment of the present disclosure, the movement controller may further include a second offset calculator for calculating a second offset by subtracting a coordinate of a second target area of the measurement target wafer from the coordinate of the measurement area of the camera by using the entire coordinates to position the second target area within the measurement area of the camera in order to move the measurement area of the camera to the second target area by skipping an identification mark, and a second target area movement controller for positioning the second target area of the measurement target wafer within the measurement area of the camera by moving the camera or the substrate stage having the measurement target wafer thereon by using the second offset.

According to the embodiment of the present disclosure, the movement controller may further include a third offset calculator for calculating a third offset by subtracting a coordinate of a third target area of the measurement target wafer from the coordinate of the measurement area of the camera by using the entire coordinates to position the third target area within the measurement area of the camera in order to move the measurement area of the camera to the third target area by skipping an identification mark, and a third target area movement controller for positioning the third target area of the measurement target wafer within the measurement area of the camera by moving the camera or the substrate stage having the measurement target wafer thereon by using the third offset.

According to the embodiment of the present disclosure, the measurement controller may measure spectral reflected light of irradiated light in order to measure surface quality of the measurement target wafer.

According to another aspect of the present disclosure, there is provided a substrate measurement control apparatus including an entire coordinate obtainer for obtaining entire coordinates for an entire area of wafer by using a standard wafer, a measurement target wafer alignment controller for aligning a measurement target wafer on a substrate stage by using at least shape features of the measurement target wafer, a movement controller for moving a camera or the substrate stage having the measurement target wafer thereon by using the entire coordinates to position a target area of the measurement target wafer within a measurement area of the camera, and a measurement controller for measuring the target area of the measurement target wafer by using the camera, wherein the entire coordinate obtainer includes a standard wafer alignment controller for aligning the standard wafer on the substrate stage by using shape features of the standard wafer, an individual die coordinate measurer for measuring an X-axis coordinate and a Y-axis coordinate of each of a plurality of dies partitioned on the standard wafer, by using the camera, and an entire die mapper for storing the X-axis and Y-axis coordinates of all dies partitioned on the standard wafer and mapping the X-axis and Y-axis coordinates to the entire coordinates, wherein the movement controller includes a first offset calculator for calculating a first offset by subtracting a coordinate of a first target area of the measurement target wafer from a coordinate of the measurement area of the camera by using the entire coordinates to position the first target area within the measurement area of the camera in order to move the measurement area of the camera to the first target area by skipping an identification mark, a first target area movement controller for positioning the first target area of the measurement target wafer within the measurement area of the camera by moving the camera or the substrate stage having the measurement target wafer thereon by using the first offset, a second offset calculator for calculating a second offset by subtracting a coordinate of a second target area of the measurement target wafer from the coordinate of the measurement area of the camera by using the entire coordinates to position the second target area within the measurement area of the camera in order to move the measurement area of the camera to the second target area by skipping an identification mark, a second target area movement controller for positioning the second target area of the measurement target wafer within the measurement area of the camera by moving the camera or the substrate stage having the measurement target wafer thereon by using the second offset, a third offset calculator for calculating a third offset by subtracting a coordinate of a third target area of the measurement target wafer from the coordinate of the measurement area of the camera by using the entire coordinates to position the third target area within the measurement area of the camera in order to move the measurement area of the camera to the third target area by skipping an identification mark, and a third target area movement controller for positioning the third target area of the measurement target wafer within the measurement area of the camera by moving the camera or the substrate stage having the measurement target wafer thereon by using the third offset, and wherein the measurement controller measures spectral reflected light of irradiated light in order to measure surface quality of the measurement target wafer.

BRIEF DESCRIPTION OF THE DRAWINGS

The above and other purposes, features and other advantages of the present disclosure will be more clearly understood from the following detailed description taken in conjunction with the accompanying drawings, in which.

The above and other features and advantages of the present disclosure will become more apparent by describing in detail embodiments thereof with reference to the attached drawings in which.

DETAILED DESCRIPTION OF THE DISCLOSURE

Figure 1:
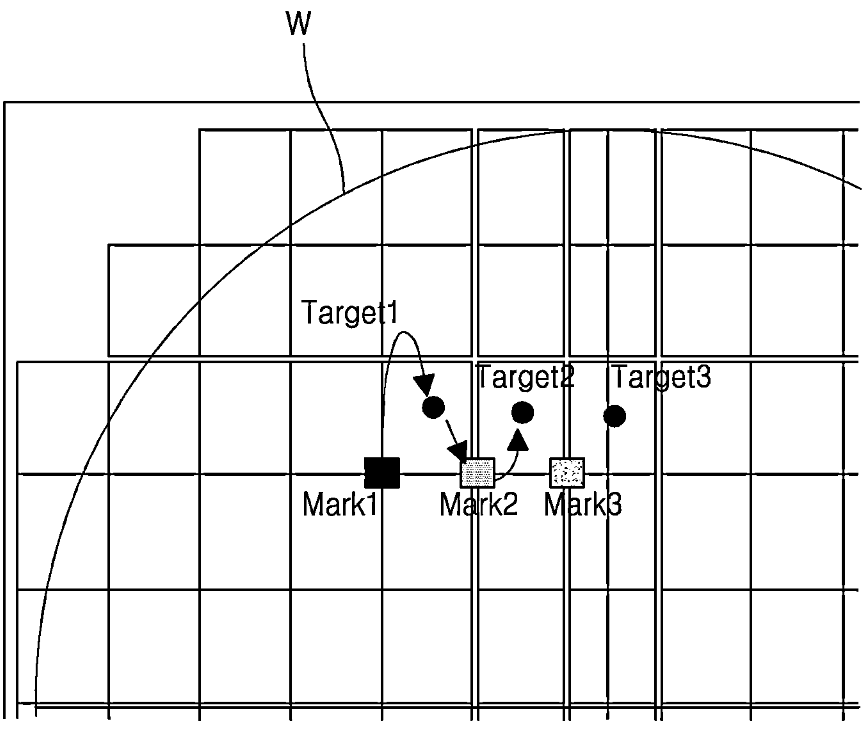
FIG. 1 is a plan view of a wafer for describing a general substrate measurement method.
Figure 2:
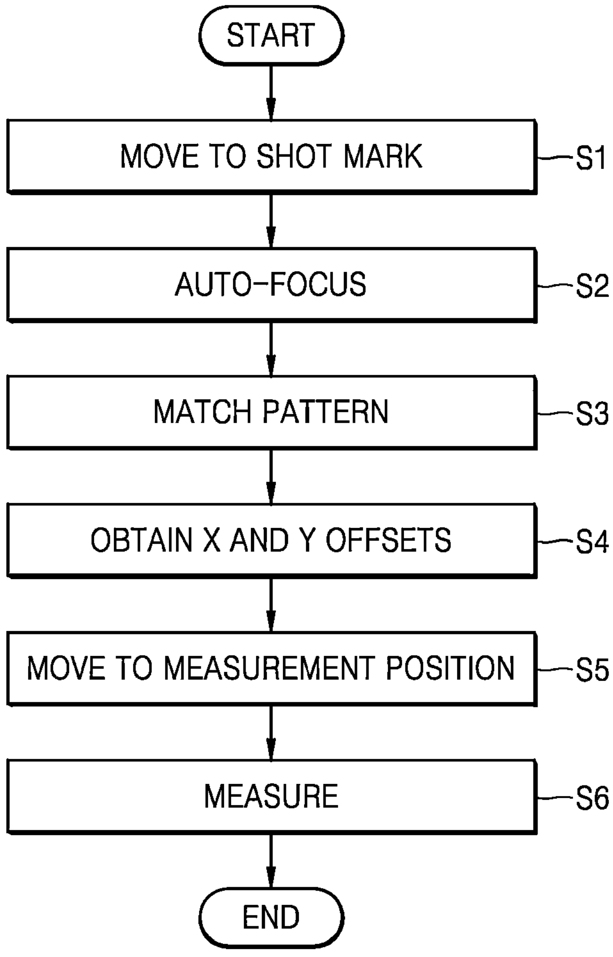
FIG. 2 is a flowchart of an example of a general substrate measurement method.

Hereinafter, the present disclosure will be described in detail by explaining embodiments of the invention with reference to the attached drawings.

The invention may however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses or sizes of layers are exaggerated for clarity and convenience of explanation.

The terminology used herein is for the purpose of describing particular embodiments and is not intended to limit the invention. As used herein, the singular forms “a”, “an”, and “the” are intended to include the plural forms as well, unless the context clearly indicates otherwise. It will be further understood that the terms “comprises” and/or “comprising”, when used in this specification, specify the presence of stated features, integers, steps, operations, elements, components, and/or groups thereof, but do not preclude the presence or addition of one or more other features, integers, steps, operations, elements, components, and/or groups thereof.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, the embodiments of the invention should not be construed as limited to the particular shapes of regions illustrated herein, but are to include deviations in shapes that result, for example, from manufacturing.

Figure 3:
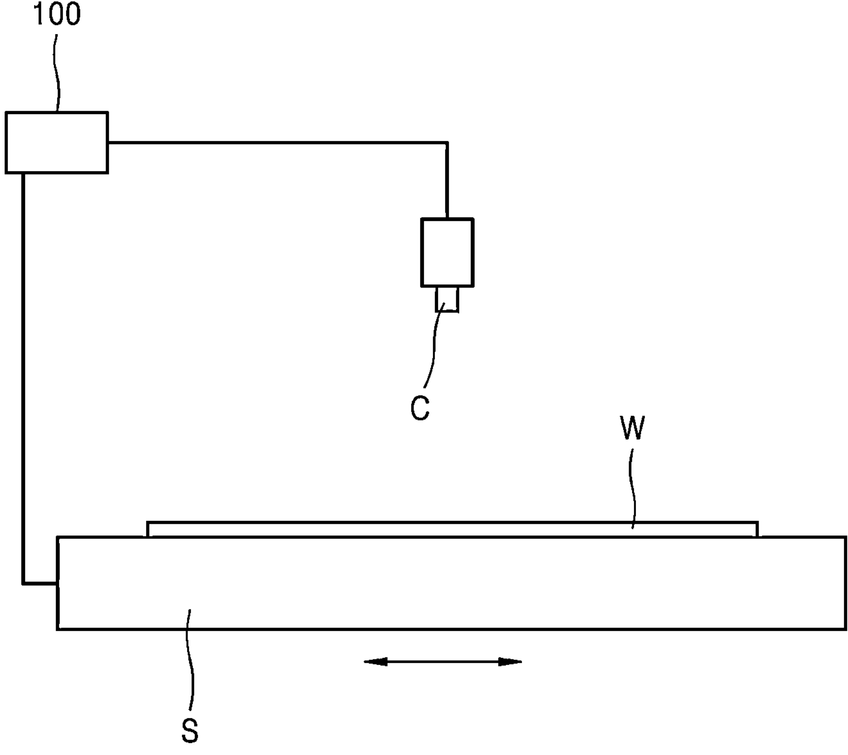
FIG. 3 is a schematic view of a substrate measurement control apparatus according to some embodiments of the present disclosure.
Figure 4:
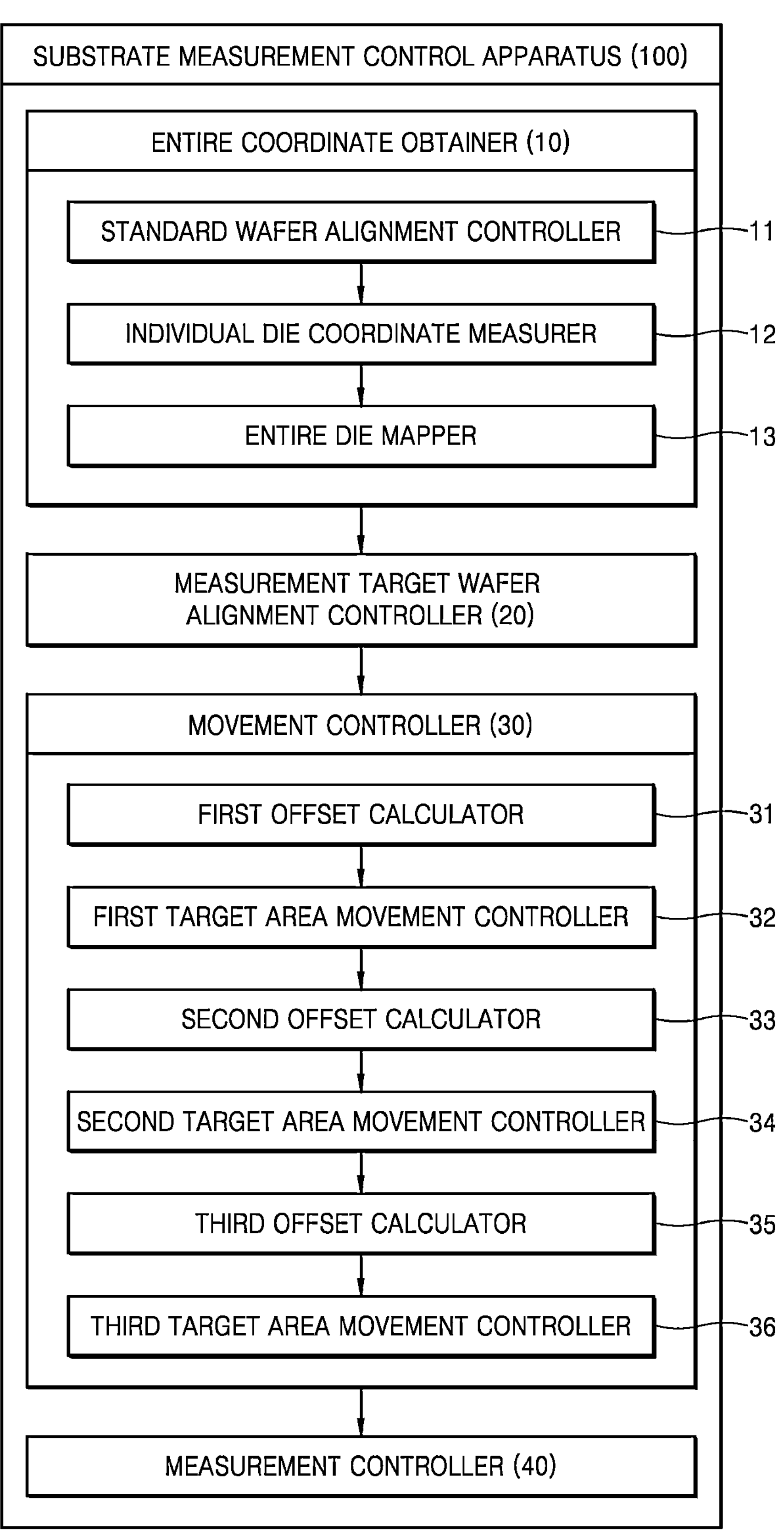
FIG. 4 is a block diagram of the substrate measurement control apparatus of FIG. 3.
Figure 5:
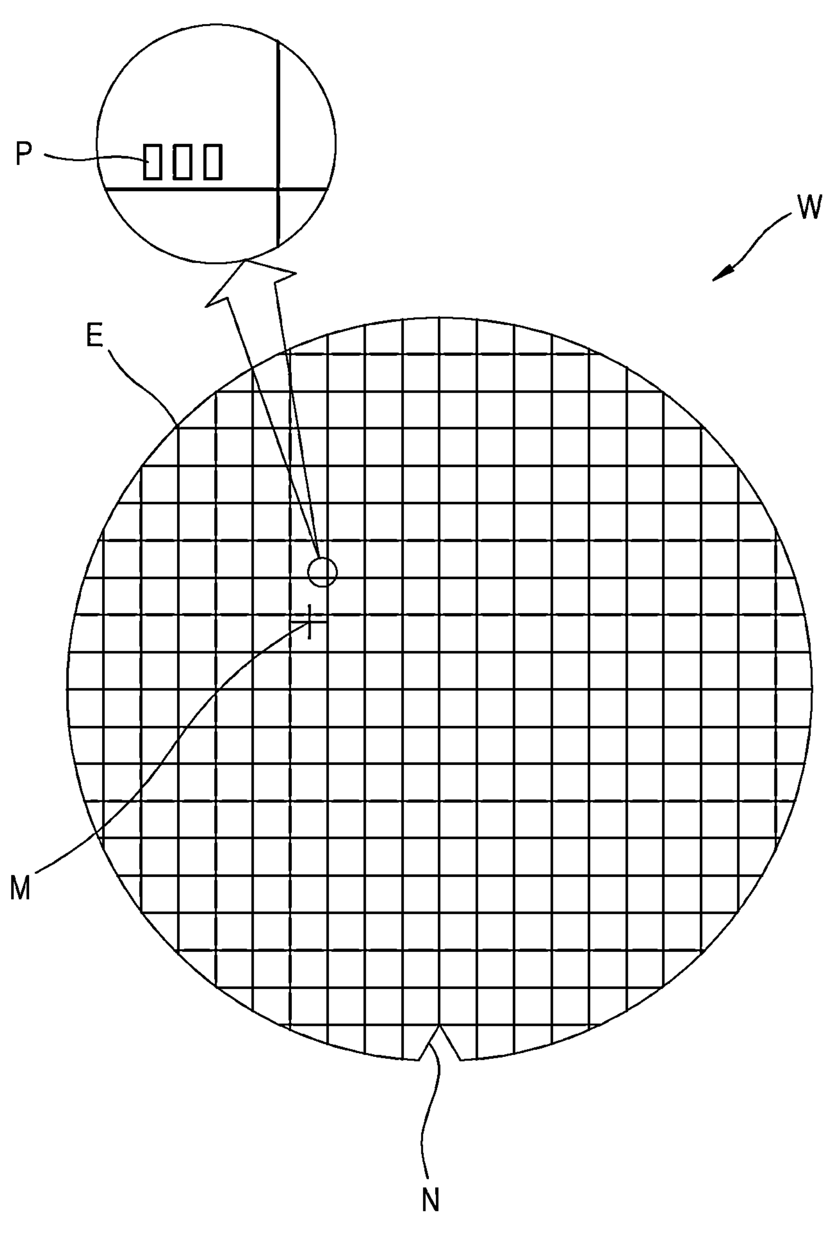
FIG. 5 is a plan view of an example of a wafer identifiably by the substrate measurement control apparatus of FIG. 3.
Figure 6:
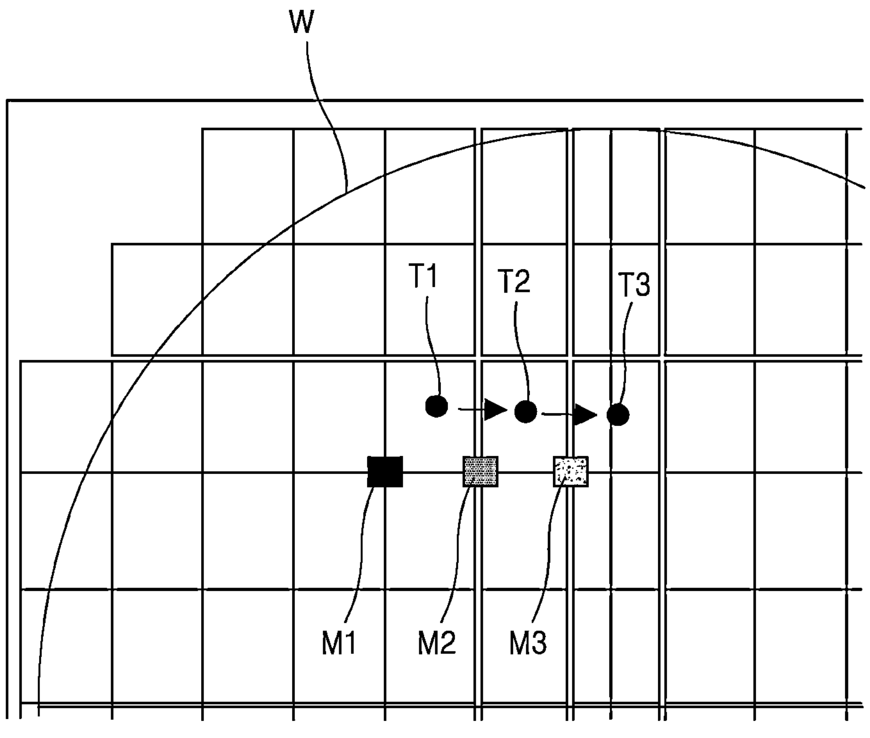
FIG. 6 is a plan view of a wafer for describing a substrate measurement process of the substrate measurement control apparatus of FIG. 3.

FIG. 3 is a schematic view of a substrate measurement control apparatus 100 according to some embodiments of the present disclosure. FIG. 4 is a block diagram of the substrate measurement control apparatus 100 of FIG. 3. FIG. 5 is a plan view of an example of a wafer W identifiably by the substrate measurement control apparatus 100 of FIG. 3. FIG. 6 is a plan view of a wafer for describing a substrate measurement process of the substrate measurement control apparatus 100 of FIG. 3.

As shown in FIGS. 3 to 6, the substrate measurement control apparatus 100 according to some embodiments of the present disclosure may include an entire coordinate obtainer 10, a measurement target wafer alignment controller 20, a movement controller 30, and a measurement controller 40.

The entire coordinate obtainer 10 may be a device or electronic component for obtaining entire coordinates for an entire area of wafer by using a standard wafer W.

The entire coordinate obtainer 10 may include a standard wafer alignment controller 11 for aligning the standard wafer W on a substrate stage S by using shape features of the standard wafer W, an individual die coordinate measurer 12 for measuring an X-axis coordinate and a Y-axis coordinate of each of a plurality of dies partitioned on the standard wafer W, by using a camera C, and an entire die mapper 13 for storing the X-axis and Y-axis coordinates of all dies partitioned on the standard wafer W and mapping the X-axis and Y-axis coordinates to the entire coordinates.

Herein, the standard wafer alignment controller 11 may recognize the shape features of the standard wafer W including at least one of an edge E, a notch N, a pattern P, and an identification mark M of the standard wafer W of FIG. 5, and combinations thereof.

The measurement target wafer alignment controller 20 may be a device or electronic component for aligning a measurement target wafer W on the substrate stage S by using at least shape features of the measurement target wafer W.

The measurement target wafer alignment controller 20 may recognize the shape features of the measurement target wafer W including at least one of an edge E, a notch N, a pattern P, and an identification mark M of the measurement target wafer W, and combinations thereof.

The movement controller 30 may be a device or electronic component for moving the camera C or the substrate stage S having the measurement target wafer W thereon by using the entire coordinates to position a target area T1, T2, or T3 of the measurement target wafer W within a measurement area of the camera C.

The movement controller 30 may include a first offset calculator 31 for calculating a first offset by subtracting a coordinate of a first target area T1 of the measurement target wafer W from a coordinate of the measurement area of the camera C by using the entire coordinates to position the first target area T1 within the measurement area of the camera C in order to move the measurement area of the camera C to the first target area T1 by skipping a first identification mark M1, and a first target area movement controller 32 for positioning the first target area T1 of the measurement target wafer W within the measurement area of the camera C by moving the camera C or the substrate stage S having the measurement target wafer W thereon by using the first offset.

The movement controller 30 may further include a second offset calculator 33 for calculating a second offset by subtracting a coordinate of a second target area T2 of the measurement target wafer W from the coordinate of the measurement area of the camera C by using the entire coordinates to position the second target area T2 within the measurement area of the camera C in order to move the measurement area of the camera C to the second target area T2 by skipping a second identification mark M2, and a second target area movement controller 34 for positioning the second target area T2 of the measurement target wafer W within the measurement area of the camera C by moving the camera C or the substrate stage S having the measurement target wafer W thereon by using the second offset.

The movement controller 30 may further include a third offset calculator 35 for calculating a third offset by subtracting a coordinate of a third target area T3 of the measurement target wafer W from the coordinate of the measurement area of the camera C by using the entire coordinates to position the third target area T3 within the measurement area of the camera C in order to move the measurement area of the camera C to the third target area T3 by skipping a third identification mark M3, and a third target area movement controller 36 for positioning the third target area T3 of the measurement target wafer W within the measurement area of the camera C by moving the camera C or the substrate stage S having the measurement target wafer W thereon by using the third offset.

The measurement controller 40 may be a device or electronic component for measuring the target area T1, T2, or T3 of the measurement target wafer W by using the movement controller 30 and the camera C.

The measurement controller 40 may be a device or electronic component for measuring spectral reflected light of irradiated light in order to measure surface quality of the measurement target wafer W.

Therefore, based on an operation procedure of the substrate measurement control apparatus 100 according to some embodiments of the present disclosure, initially, as shown in FIG. 4, the entire coordinate obtainer 10 may obtain the entire coordinates for the entire area of wafer by using the standard wafer W.

In this case, the standard wafer alignment controller 11 may align the standard wafer W on the substrate stage S by using the shape features of the standard wafer W, the individual die coordinate measurer 12 may measure the X-axis and Y-axis coordinates of each of the plurality of dies partitioned on the standard wafer W, by using the camera C, and the entire die mapper 13 may store the X-axis and Y-axis coordinates of all dies partitioned on the standard wafer W and map the X-axis and Y-axis coordinates to the entire coordinates.

Herein, as shown in FIG. 5, the standard wafer alignment controller 11 may recognize the shape features of the standard wafer W including at least one of the edge E, the notch N, the pattern P, and the identification mark M of the standard wafer W, and combinations thereof.

Then, the measurement target wafer alignment controller 20 may align the measurement target wafer W on the substrate stage S by using at least the shape features of the measurement target wafer W.

In this case, as also shown in FIG. 5, the measurement target wafer alignment controller 20 may recognize the shape features of the measurement target wafer W including at least one of the edge E, the notch N, the pattern P, and the identification mark M of the measurement target wafer W, and combinations thereof.

Then, as shown in FIG. 6, the movement controller 30 may move the camera C or the substrate stage S having the measurement target wafer W thereon by using the entire coordinates to position the target area T1, T2, or T3 of the measurement target wafer W within the measurement area of the camera C.

Initially, the first offset calculator 31 may calculate the first offset by subtracting the coordinate of the first target area T1 of the measurement target wafer W from the coordinate of the measurement area of the camera C by using the entire coordinates to position the first target area T1 within the measurement area of the camera C in order to move the measurement area of the camera C to the first target area T1 by skipping the first identification mark M1, and the first target area movement controller 32 may position the first target area T1 of the measurement target wafer W within the measurement area of the camera C by moving the camera C or the substrate stage S having the measurement target wafer W thereon by using the first offset.

Then, the second offset calculator 33 may calculate the second offset by subtracting the coordinate of the second target area T2 of the measurement target wafer W from the coordinate of the measurement area of the camera C by using the entire coordinates to position the second target area T2 within the measurement area of the camera C in order to move the measurement area of the camera C to the second target area T2 by skipping the second identification mark M2, and the second target area movement controller 34 may position the second target area T2 of the measurement target wafer W within the measurement area of the camera C by moving the camera C or the substrate stage S having the measurement target wafer W thereon by using the second offset.

Thereafter, the third offset calculator 35 may calculate the third offset by subtracting the coordinate of the third target area T3 of the measurement target wafer W from the coordinate of the measurement area of the camera C by using the entire coordinates to position the third target area T3 within the measurement area of the camera C in order to move the measurement area of the camera C to the third target area T3 by skipping the third identification mark M3, and the third target area movement controller 36 may position the third target area T3 of the measurement target wafer W within the measurement area of the camera C by moving the camera C or the substrate stage S having the measurement target wafer W thereon by using the third offset.

Then, the measurement controller 40 may measure the target area T1, T2, or T3 of the measurement target wafer W by using the movement controller 30 and the camera C, and measure spectral reflected light of irradiated light in order to measure surface quality of the measurement target wafer W.

Figure 7:
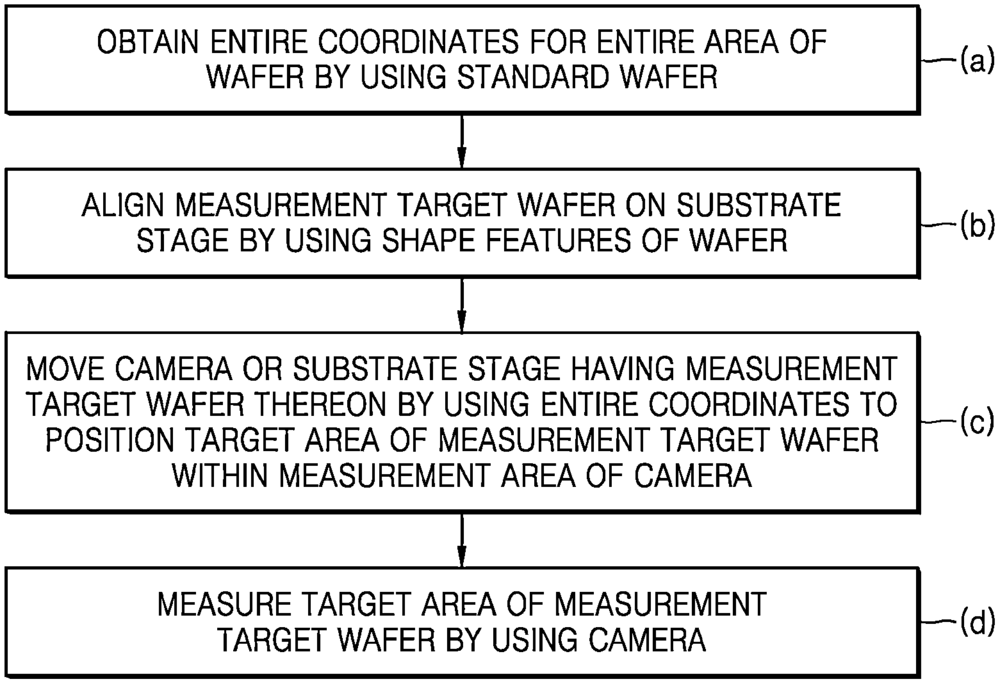
FIG. 7 is a flowchart of a substrate measurement method according to some embodiments of the present disclosure.

FIG. 7 is a flowchart of a substrate measurement method according to some embodiments of the present disclosure.

As shown in FIGS. 3 to 7, the substrate measurement method according to some embodiments of the present disclosure may include (a) obtaining the entire coordinates for the entire area of wafer by using the standard wafer W, (b) aligning the measurement target wafer W on the substrate stage S by using at least the shape features of the measurement target wafer W, (c) moving the camera C or the substrate stage S having the measurement target wafer W thereon by using the entire coordinates to position the target area T1, T2, or T3 of the measurement target wafer W within the measurement area of the camera C, and (d) measuring the target area T1, T2, or T3 of the measurement target wafer W by using the camera C.

Figure 8:
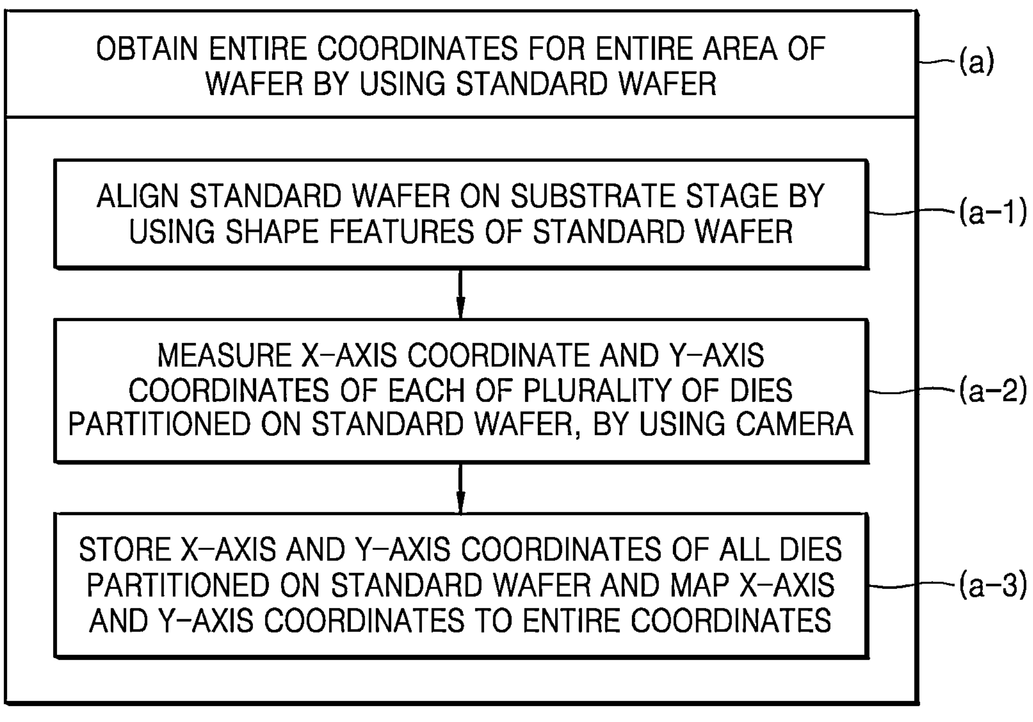
FIG. 8 is a detailed flowchart of step (a) of the substrate measurement method of FIG. 7.

FIG. 8 is a detailed flowchart of step (a) of the substrate measurement method of FIG. 7.

As shown in FIGS. 3 to 8, step (a) may include (a-1) aligning the standard wafer W on the substrate stage S by using the shape features of the standard wafer W, (a-2) measuring the X-axis and Y-axis coordinates of each of the plurality of dies partitioned on the standard wafer W, by using the camera C, and (a-3) storing the X-axis and Y-axis coordinates of all dies partitioned on the standard wafer W and mapping the X-axis and Y-axis coordinates to the entire coordinates.

In step (a-1), the shape features of the standard wafer W may include at least one of the edge E, the notch N, the pattern P, and the identification mark M of the standard wafer W, and combinations thereof.

In step (b), the shape features of the measurement target wafer W may include at least one of the edge E, the notch N, the pattern P, and the identification mark M of the measurement target wafer W, and combinations thereof.

Figure 9:
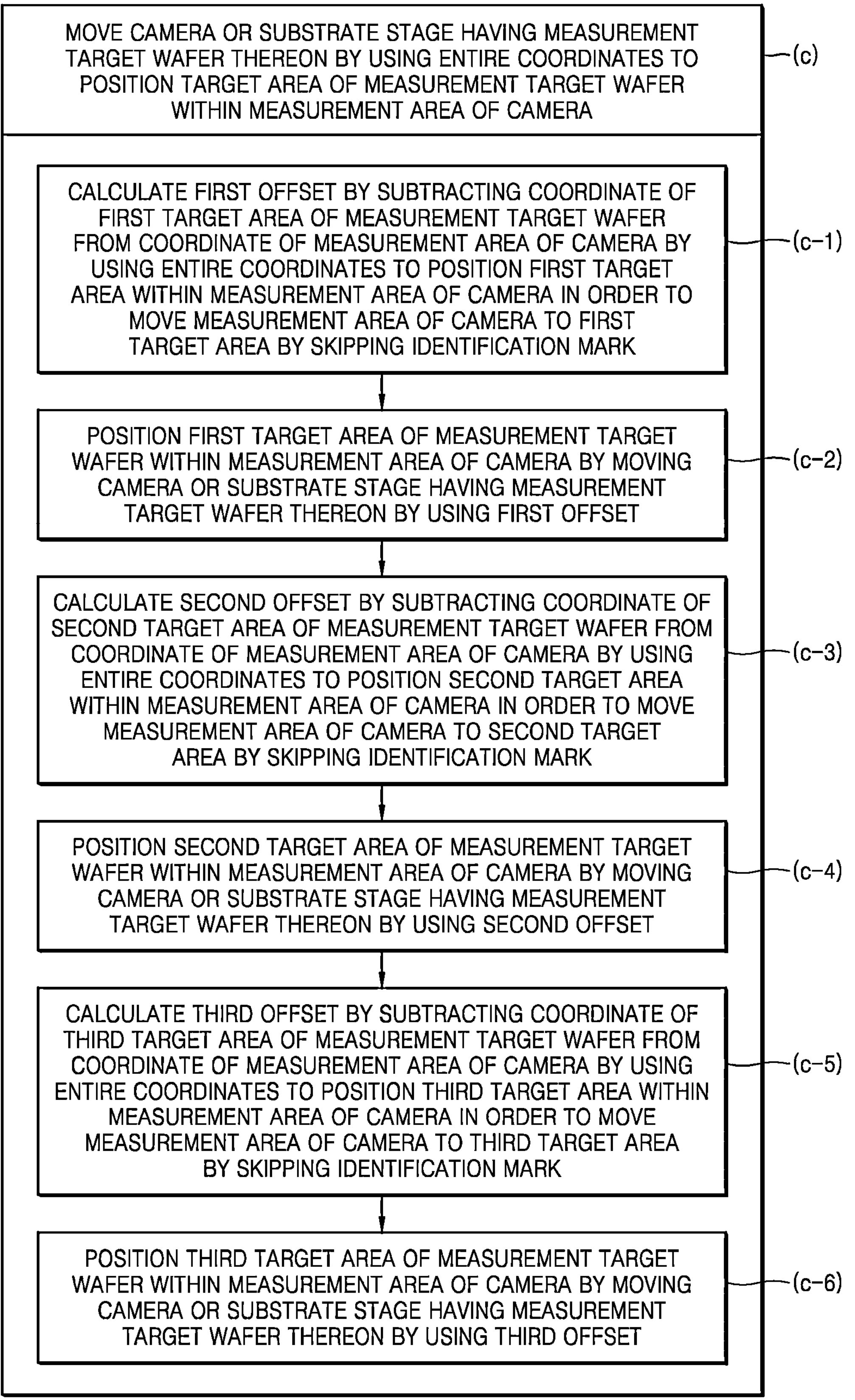
FIG. 9 is a detailed flowchart of step (c) of the substrate measurement method of FIG. 7.

FIG. 9 is a detailed flowchart of step (c) of the substrate measurement method of FIG. 7.

As shown in FIGS. 3 to 9, step (c) may include (c-1) calculating the first offset by subtracting the coordinate of the first target area T1 of the measurement target wafer W from the coordinate of the measurement area of the camera C by using the entire coordinates to position the first target area T1 within the measurement area of the camera C in order to move the measurement area of the camera C to the first target area T1 by skipping the first identification mark M1, (c-2) positioning the first target area T1 of the measurement target wafer W within the measurement area of the camera C by moving the camera C or the substrate stage S having the measurement target wafer W thereon by using the first offset, (c-3) calculating the second offset by subtracting the coordinate of the second target area T2 of the measurement target wafer W from the coordinate of the measurement area of the camera C by using the entire coordinates to position the second target area T2 within the measurement area of the camera C in order to move the measurement area of the camera C to the second target area T2 by skipping the second identification mark M2, (c-4) positioning the second target area T2 of the measurement target wafer W within the measurement area of the camera C by moving the camera C or the substrate stage S having the measurement target wafer W thereon by using the second offset, (c-5) calculating the third offset by subtracting the coordinate of the third target area T3 of the measurement target wafer W from the coordinate of the measurement area of the camera C by using the entire coordinates to position the third target area T3 within the measurement area of the camera C in order to move the measurement area of the camera C to the third target area T3 by skipping the third identification mark M3, and (c-6) positioning the third target area T3 of the measurement target wafer W within the measurement area of the camera C by moving the camera C or the substrate stage S having the measurement target wafer W thereon by using the third offset.

Herein, the first offset may include an X-axis offset and a Y-axis offset, or a shortest moving distance to which the X-axis and Y-axis offsets are reflected.

Step (d) may include measuring spectral reflected light of irradiated light in order to measure surface quality of the measurement target wafer W.

The standard wafer W may be the same as or have the same size as the measurement target wafer W.

Figure 10:
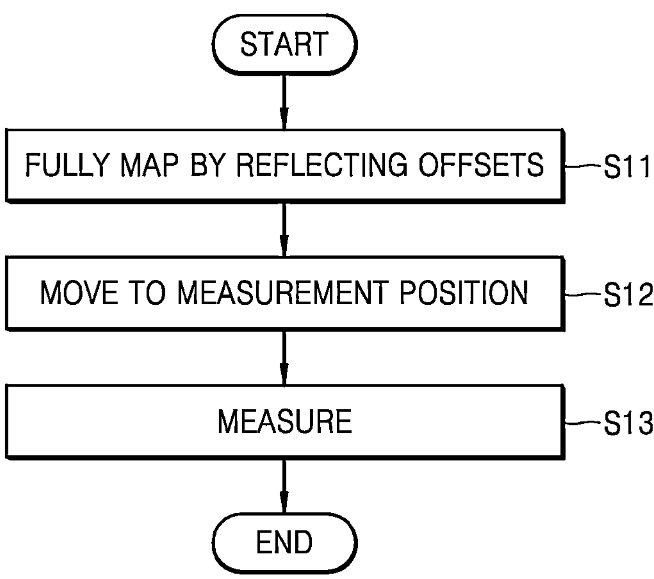
FIG. 10 is a flowchart of a substrate measurement method according to other embodiments of the present disclosure.

FIG. 10 is a flowchart of a substrate measurement method according to other embodiments of the present disclosure.

Therefore, as shown in FIG. 10, based on the substrate measurement method according to other embodiments of the present disclosure, offsets for an entire area including all target areas may be previously mapped (S11), the camera C or the substrate stage S may be directly moved to a measurement position, i.e., a target area (S12), and the target area may be immediately measured (S13).

Figure 11:
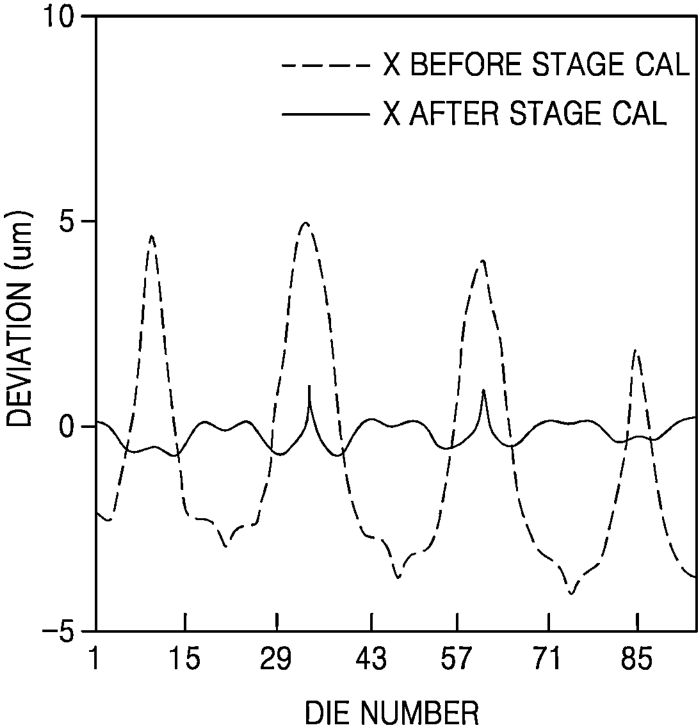
FIGS. 11 to 13 are graphs showing effects of the substrate measurement method and the substrate measurement control apparatus of the present disclosure.
Figure 12:
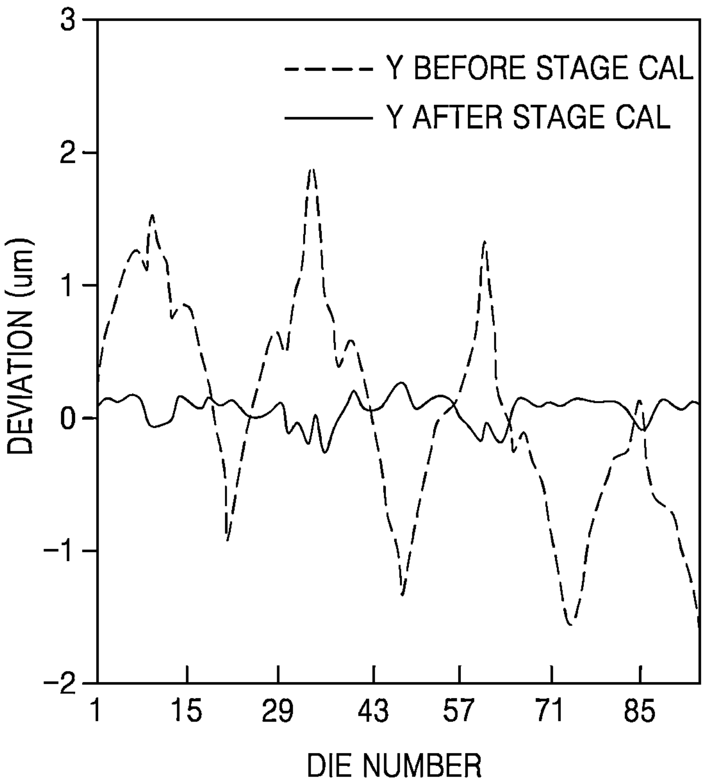
Figure 13:
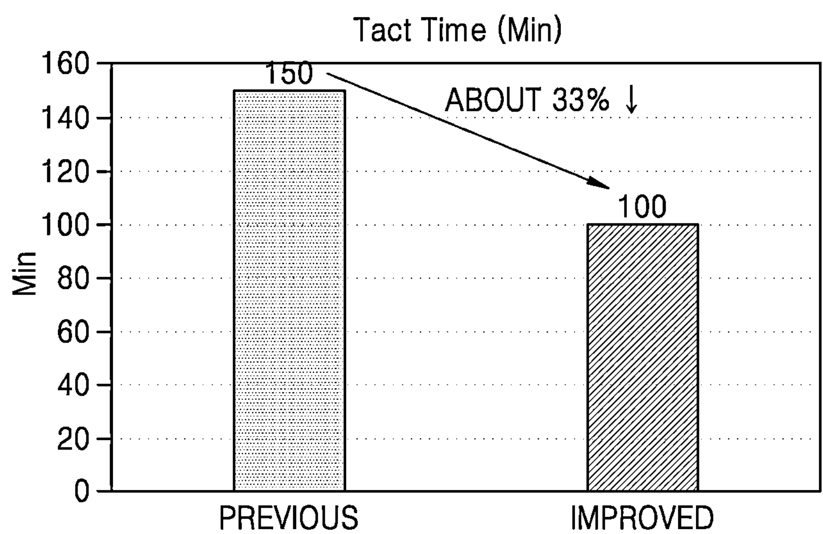

FIGS. 11 to 13 are graphs showing the effect of the substrate measurement method and the substrate measurement control apparatus 100 of the present disclosure.

As shown in FIG. 11, before full mapping (Stage Cal) of the present disclosure, a very large X-axis deviation of 5 μm to −5 μm is exhibited even when the number of dies increases. However, after full mapping (Stage Cal) of the present disclosure, the X-axis deviation is greatly reduced to 1 μm to −1 μm regardless of the number of dies. Likewise, as shown in FIG. 12, before full mapping (Stage Cal) of the present disclosure, a large Y-axis deviation of 2 μm to −2 μm is exhibited even when the number of dies increases. However, after full mapping (Stage Cal) of the present disclosure, the Y-axis deviation is greatly reduced to 0.1 μm to −0.1 μm regardless of the number of dies.

Therefore, as shown in FIG. 13, according to the present disclosure, precision of measurement may be increased and measurement time of equipment may be greatly reduced. For example, when a full chip includes 1,500 dies, a previous tack time of about 2.5 hours or more may be reduced by more than 50 minutes, thereby saving about 33% or more of the time.

According to the afore-described embodiments of the present disclosure, precision of measurement may be increased and measurement time of equipment may be greatly reduced by mapping an entire area at a time by using a standard wafer and thus directly moving to targets. For example, when a full chip includes 1,500 dies, a previous tack time of about 2.5 hours or more may be reduced by more than 50 minutes, thereby saving about 33% or more of the time. However, the scope of the present disclosure is not limited thereto.

While the present disclosure has been particularly shown and described with reference to embodiments thereof, it will be understood by one of ordinary skill in the art that various changes in form and details may be made therein without departing from the scope of the present disclosure as defined by the following claims.

What is claimed is:

1. A substrate measurement method comprising:

(a) obtaining entire coordinates for an entire area of wafer by using a standard wafer;

(b) aligning a measurement target wafer on a substrate stage by using at least shape features of the measurement target wafer;

(c) moving a camera or the substrate stage having the measurement target wafer thereon by using the entire coordinates to position a target area of the measurement target wafer within a measurement area of the camera; and (d) measuring the target area of the measurement target wafer by using the camera, wherein step (c) comprises:

(c-1) calculating a first offset by subtracting a coordinate of a first target area of the measurement target wafer from a coordinate of the measurement area of the camera by using the entire coordinates to position the first target area within the measurement area of the camera in order to move the measurement area of the camera to the first target area by skipping a first identification mark of the measurement target wafer; and (c-2) positioning the first target area of the measurement target wafer within the measurement area of the camera by moving the camera or the substrate stage having the measurement target wafer thereon by using the first offset.

2. The substrate measurement method of claim 1, wherein step (a) comprises:

(a-1) aligning the standard wafer on the substrate stage by using shape features of the standard wafer;

(a-2) measuring an X-axis coordinate and a Y-axis coordinate of each of a plurality of dies partitioned on the standard wafer, by using the camera; and (a-3) storing the X-axis coordinate and the Y-axis coordinate of all dies partitioned on the standard wafer and mapping the X-axis coordinate and the Y-axis coordinate to the entire coordinates.

3. The substrate measurement method of claim 2, wherein, in step (a-1), the shape features of the standard wafer comprise at least one of an edge, a notch, a pattern, and an identification mark of the standard wafer, and combinations thereof.

4. The substrate measurement method of claim 1, wherein, in step (b), the shape features of the measurement target wafer comprise at least one of an edge, a notch, a pattern, and combinations thereof.

5. The substrate measurement method of claim 1, wherein, in step (c-2), the first offset comprises an X-axis offset and a Y-axis offset.

6. The substrate measurement method of claim 5, wherein, in step (c-2), the first offset comprises a shortest moving distance to which the X-axis offset and the Y-axis offset are reflected.

7. The substrate measurement method of claim 1, wherein step (c) further comprises:

(c-3) calculating a second offset by subtracting a coordinate of a second target area of the measurement target wafer from the coordinate of the measurement area of the camera by using the entire coordinates to position the second target area within the measurement area of the camera in order to move the measurement area of the camera to the second target area by skipping a second identification mark of the measurement target wafer; and (c-4) positioning the second target area of the measurement target wafer within the measurement area of the camera by moving the camera or the substrate stage having the measurement target wafer thereon by using the second offset.

8. The substrate measurement method of claim 7, wherein step (c) further comprises:

(c-5) calculating a third offset by subtracting a coordinate of a third target area of the measurement target wafer from the coordinate of the measurement area of the camera by using the entire coordinates to position the third target area within the measurement area of the camera in order to move the measurement area of the camera to the third target area by skipping an third identification mark of the measurement target wafer; and (c-6) positioning the third target area of the measurement target wafer within the measurement area of the camera by moving the camera or the substrate stage having the measurement target wafer thereon by using the third offset.

9. The substrate measurement method of claim 1, wherein step (d) comprises measuring spectral reflected light of irradiated light in order to measure surface quality of the measurement target wafer.

10. The substrate measurement method of claim 1, wherein the standard wafer is same as or has a same size as the measurement target wafer.

11. A substrate measurement control apparatus comprising:

an entire coordinate obtainer configured to obtain entire coordinates for an entire area of wafer by using a standard wafer;

a measurement target wafer alignment controller configured to align a measurement target wafer on a substrate stage by using at least shape features of the measurement target wafer;

a movement controller configured to move a camera or the substrate stage having the measurement target wafer thereon by using the entire coordinates to position a target area of the measurement target wafer within a measurement area of the camera; and a measurement controller configured to measure the target area of the measurement target wafer by using the camera, wherein the movement controller comprises:

a first offset calculator configured to calculate a first offset by subtracting a coordinate of a first target area of the measurement target wafer from a coordinate of the measurement area of the camera by using the entire coordinates to position the first target area within the measurement area of the camera in order to move the measurement area of the camera to the first target area by skipping a first identification mark of the measurement target wafer; and a first target area movement controller configured to position the first target area of the measurement target wafer within the measurement area of the camera by moving the camera or the substrate stage having the measurement target wafer thereon by using the first offset.

12. The substrate measurement control apparatus of claim 11, wherein the entire coordinate obtainer comprises:

a standard wafer alignment controller configured to align the standard wafer on the substrate stage by using shape features of the standard wafer;

an individual die coordinate measurer configured to measure an X-axis coordinate and a Y-axis coordinate of each of a plurality of dies partitioned on the standard wafer, by using the camera; and an entire die mapper configured to store the X-axis coordinate and the Y-axis coordinate of all dies partitioned on the standard wafer, and the entire die mapper configured to map the X-axis coordinate and the Y-axis coordinate to the entire coordinates.

13. The substrate measurement control apparatus of claim 12, wherein the standard wafer alignment controller is configured to recognize the shape features of the standard wafer comprising at least one of an edge, a notch, a pattern, and an identification mark of the standard wafer, and combinations thereof.

14. The substrate measurement control apparatus of claim 11, wherein the measurement target wafer alignment controller is configured to recognize the shape features of the measurement target wafer comprising at least one of an edge, a notch, a pattern, and combinations thereof.

15. The substrate measurement control apparatus of claim 11, wherein the movement controller further comprises:

a second offset calculator configured to calculate a second offset by subtracting a coordinate of a second target area of the measurement target wafer from the coordinate of the measurement area of the camera by using the entire coordinates to position the second target area within the measurement area of the camera in order to move the measurement area of the camera to the second target area by skipping a second identification mark of the measurement target wafer; and a second target area movement controller configured to position the second target area of the measurement target wafer within the measurement area of the camera by moving the camera or the substrate stage having the measurement target wafer thereon by using the second offset.

16. The substrate measurement control apparatus of claim 15, wherein the movement controller further comprises:

a third offset calculator configured to calculate a third offset by subtracting a coordinate of a third target area of the measurement target wafer from the coordinate of the measurement area of the camera by using the entire coordinates to position the third target area within the measurement area of the camera in order to move the measurement area of the camera to the third target area by skipping a third identification mark of the measurement target wafer; and a third target area movement controller configured to position the third target area of the measurement target wafer within the measurement area of the camera by moving the camera or the substrate stage having the measurement target wafer thereon by using the third offset.

17. The substrate measurement control apparatus of claim 11, wherein the measurement controller is configured to measure spectral reflected light of irradiated light in order to measure surface quality of the measurement target wafer.

18. A substrate measurement control apparatus comprising:

an entire coordinate obtainer configured to obtain entire coordinates for an entire area of wafer by using a standard wafer;

a measurement target wafer alignment controller configured to align a measurement target wafer on a substrate stage by using at least shape features of the measurement target wafer;

a movement controller configured to move a camera or the substrate stage having the measurement target wafer thereon by using the entire coordinates to position a target area of the measurement target wafer within a measurement area of the camera; and a measurement controller configured to measure the target area of the measurement target wafer by using the camera, wherein the entire coordinate obtainer comprises:

a standard wafer alignment controller configured to align the standard wafer on the substrate stage by using shape features of the standard wafer;

an individual die coordinate measurer configured to measure an X-axis coordinate and a Y-axis coordinate of each of a plurality of dies partitioned on the standard wafer, by using the camera; and an entire die mapper configured to store the X-axis coordinate and the Y-axis coordinate of all dies partitioned on the standard wafer, and the entire die mapper configured to map the X-axis coordinate and the Y-axis coordinate to the entire coordinates, wherein the movement controller comprises:

a first offset calculator configured to calculate a first offset by subtracting a coordinate of a first target area of the measurement target wafer from a coordinate of the measurement area of the camera by using the entire coordinates to position the first target area within the measurement area of the camera in order to move the measurement area of the camera to the first target area by skipping a first identification mark of the measurement target wafer;

a first target area movement controller configured to position the first target area of the measurement target wafer within the measurement area of the camera by moving the camera or the substrate stage having the measurement target wafer thereon by using the first offset;

a second offset calculator configured to calculate a second offset by subtracting a coordinate of a second target area of the measurement target wafer from the coordinate of the measurement area of the camera by using the entire coordinates to position the second target area within the measurement area of the camera in order to move the measurement area of the camera to the second target area by skipping a second identification mark of the measurement target wafer;

a second target area movement controller configured to position the second target area of the measurement target wafer within the measurement area of the camera by moving the camera or the substrate stage having the measurement target wafer thereon by using the second offset;

a third offset calculator configured to calculate a third offset by subtracting a coordinate of a third target area of the measurement target wafer from the coordinate of the measurement area of the camera by using the entire coordinates to position the third target area within the measurement area of the camera in order to move the measurement area of the camera to the third target area by skipping a third identification mark of the measurement target wafer; and a third target area movement controller configured to position the third target area of the measurement target wafer within the measurement area of the camera by moving the camera or the substrate stage having the measurement target wafer thereon by using the third offset, and wherein the measurement controller is configured to measure spectral reflected light of irradiated light in order to measure surface quality of the measurement target wafer.

* * * * *